Patented Oct. 11, 1938

2,132,687

UNITED STATES PATENT OFFICE 2,132,687

SHORTENING MATERIAL AND CAKE MADE THEREFROM

Benjamin R. Harris, Chicago, Ill., assignor to The Procter & Gamble Company, Cincinnati, Ohio, a corporation of Ohio No Drawing. Original application June 2, 1933, Serial No. 674,036. Divided and this application May 9, 1938, Serial No. 206,944

14 Claims. (Cl. 99—92)

My invention relates to an improved shortening composition and method of producing the same. This application is a division of my copending application, Serial No. 674,036, filed June 2, 1933.

By the term "shortening" I mean substances of an oleaginous nature usually used in the food industries in baking and the like. In a more limited sense, "shortening" is intended to describe the oleaginous material employed in baked flour products in combination with aqueous material used to distribute sugar, flavor and other ingredients in a cake emulsion batter. Examples of such shortenings are lard, hydrogenated liquid oils, such as hydrogenated cotton seed oil, and the like. My invention is principally designed to take the place of materials of this kind in baked flour products, although it may have other uses in the culinary arts.

The principal object of my invention is the provision of an improved shortening composition.

Another object is the provision of a shortening composition which will improve the character of baked flour products.

A further object is the provision of a shortening material by means of which the amount of moisture incorporated in a baked flour product may be increased.

Another object is the provision of an improved shortening which, by increasing the amount of moisture present in a baked flour, can be employed to increase the amounts of water soluble material going into such product.

Another object is the provision of an improved shortening which will assist in the formation of a flour batter emulsion in the manufacture of cake.

For instance, in carrying out the object of my invention I produce an improved shortening comprising in general a hydrogenated oil or fat having incorporated therein as an addition agent, a relatively small amount of a hydrophyllic lipin of the character described in my prior U. S. Letters Patent, No. 1,917,254, granted July 11, 1933. The hydrogenated fat or oil may, of course, be derived from a single oil or fat or a mixture of oils and fats from different sources. Preferably, it should have a melting temperature of between 95° to 105° F., although the range may be modified somewhat. In forming the improved shortening, the hydrogenated fat or oil is melted, the hydrophyllic lipin introduced into the melted fat or oil and dispersed completely therethrough by stirring, after which the melted mixture is chilled over a roll from which it is removed in the form of chips or shavings. It is then beaten, and in the process of beating a desired amount of air may be incorporated therewith. In place of air, any suitable inert gas may be incorporated such as, for example, carbon dioxide. In some cases, I may dissolve a small proportion, from 1% to 2%, of my hydrophyllic lipin in a liquid oil to use same for special shortening in certain types of baked products, but the finished product should still have fluidity at ordinary room temperatures.

As described in detail in my prior patent, the hydrophyllic lipins of my invention have a capacity to imbibe moisture but have oleaginous properties so that they will disperse readily, uniformly and homogeneously through the oleaginous mass and function as shortening materials, in many respects similar to ordinary shortening. I have discovered that when a relatively small amount of these materials is added to partially hydrogenated oils they increase the water imbibing capacity of the shortening and improve its shortening properties.

My invention has many advantages over the shortenings heretofore known. Since considerable air or other gas is incorporated therein, the shortening itself has a leavening action which assists in producing a light, baked flour batter. It aids in producing a fluffy product, which is readily mixed in the flour dough by reason particularly of its comparatively subdivided condition.

The improved shortening as a whole possesses greater capacity to absorb moisture from such substances as milk or egg material. This increased moisture has considerable effect in retarding staling in the baked product. The product of my invention has an effect of an emulsifying agent, assisting in the formation of better flour batter emulsions. Cake batters may be made which have the ingredients more evenly dispersed and more easily mixed.

The improved shortening also increases the amount of water soluble material which may be incorporated in a cake. In other words, the proportionate amount of materials such as sugar used in the cake can be greatly increased. Since the amount of moisture in the cake batter is increased, more material such as sugar which is soluble in water can be used. Glycerine may also be used for this purpose. Thus by using my shortening in cake batter, I can incorporate a much larger proportion of aqueous materials to exceed the weight of flour used in a batter. I can also incorporate a much greater amount of sugar than flour in the batter, and have the same properly distributed. In view of the modification of the surface tension, my shortening has better wetting properties when in contact with the aqueous and other constituents of the cake batter.

The class of compounds which I characterize as hydrophyllic lipins and which have the capacity in a marked degree when used in relatively small proportions as addition agents to aid in the retention of moisture and assist in the imbibing of moisture in baked flour products may be said to be the higher acyl and alkyl and similar innocuous derivatives of various polyhydroxy compounds having free OH groups. Many of these substances may be represented by the general formula

$$(RO)_v X(OH_w (H)_z$$

wherein "O" and "H" are oxygen and hydrogen respectively, "v", "w" and "z" are relatively small whole numbers, "X" represents the carbon skeleton of a polyhydroxy substance with groups (OH) and (RO), wherein "R" is an acyl, alkyl, or some other substantially lipophyllic group, and wherein the ratio of "w" to "v" is at least one.

Examples of compounds which can be used in accordance with the present invention are mono-stearic acid ester of glycerine (monostearyl glycerol), mono-palmitic acid ester of glycerol, monocetyl ether of glycerol, monomyristyl glycerol, monolauryl glycerol, monomyristyl diethylene glycol, monomelissyl diethylene glycol, monopalmityl glycerol, mono-oleyl diethylene glycol, mono-oleyl diglycerol, mono-oleyl glycerol, diethylene glycol mono-stearate, 1,6-dilauryl diglycerol, and their equivalents. I also include in this group alkyl and acyl derivatives of mannitol, sorbitol, poly-glycerols and similar polyhydroxy compounds wherein a sufficient number of the hydroxy groups remain unesterified or uncombined with high molecular weight lipophile groups so as to leave the compounds sufficiently hydrophyllic for my purposes.

Of the class of substances just described, there are two sub-classes which contain many important compounds, and to which I wish to direct particular attention. The first sub-class comprises hydrophyllic, higher alkyl and acyl derivatives of poly-hydroxy compounds which contain more than one free OH group. More specifically, under this group are the hydrophyllic stearic acid esters of poly-hydroxy compounds containing more than one free OH group. Of this class, the compound with which I have obtained the most satisfactory results in my experimental work is monostearyl glycerol (mono-stearine).

The second sub-class of compounds comprises the higher molecular weight alkyl and acyl derivatives of glycols. These compounds may have one free glycol hydroxy group. The most important example under this class is mono-stearyl diethylene glycol (diethylene glycol monostearate).

As a specific example of the operation of my invention, I select a good grade of cotton seed oil and hydrogenate the same until it has a clearing point of somewhere between 95° to 105° F. and an iodine number between 60 and 75 or thereabouts. The partially hydrogenated oil is then mixed in a melted condition with one or two per-cent of monostearyl glycerol (monostearine). The product is chilled over a roll, scraped therefrom and the air or gas beaten into it until it is changed to a fluffy condition best suited for use as a shortening material. Other partially hydrogenated oils plastic at room temperatures may be used.

For a shortening to be used in a baked flour product, such as bread or cake, the product should be plastic at ordinary room temperature. Conditions may require some modification, however, as in the example of puffed paste given below, wherein usually a higher melting point fat is desired. The type of shortening material which I prefer to use, however, is one of vegetable origin, preferably a deodorized partially hydrogenated vegetable oil. The usual liquid oils of commerce such as cotton seed oil, corn oil, peanut oil and the like can be used with very good results. Also coconut oils are advantageous when properly treated by hydrogenation to render them plastic at ordinary room temperatures.

The shortening so produced can be used in a cake in substantially the same way that usual shortenings are used. The procedure may also be modified in the order of adding the various materials depending upon the type of baked product desired. In all events, however, by employing the improved shortening of my invention, the amount of aqueous liquids such as eggs and milk used in a cake batter can be increased as well as the amount of sugar.

I utilize my new compounds in the preparation of any baked product such as puffed pastry and various types of cakes, the main object being that by the use of my compounds I can incorporate into the flour batter a larger proportion of moisture and other materials used in baking. The materials are distributed more uniformly throughout the batter and sogginess in the finished baked product is reduced. If a larger percentage of aqueous materials is used with ordinary shortenings known heretofore, the portion of baked cake closer to the bottom will be denser and packed closer and present a condition usually called sogginess. However, by using my improved shortening containing an ingredient which modifies the shortening properties to an extent so it will absorb a larger amount of moisture from the aqueous material such as milk and the like used in baking, it will reduce the condition of sogginess, distribute all of the ingredients in the cake batter more uniformly, produce a baked product which is more fluffy, and which has a better texture and appearance.

My invention can be carried out in several ways. I may use an ordinary shortening known heretofore and then disperse in the aqueous materials such as eggs, milk, or in a portion of the aqueous material used in the cake batter formula, my hydrophyllic lipin and add same to the cake batter. This produces an emulsion which contains the usual oleaginous material of the ordinary type of shortening, with aqueous material, and my hydrophyllic lipin dispersed in the emulsified batter.

I may also disperse my hydrophyllic lipin in aqueous material to make about a 40% to 50% paste, and then conveniently use this paste by dispersing it further in a portion of the aqueous materials, such as milk used in the cake formula, and proceed to mix the other ingredients, such as the ordinary shortening, flour, milk, eggs, baking powder, and flavoring, to produce the cake emulsion batter. In all cases I use a larger proportion of aqueous material, such as eggs and milk, and a larger proportion of sugar than used heretofore and obtain a cake of better texture and appearance.

I prefer to use an alternative process by dissolving a relatively small amount of my hydrophyllic lipin as an addition product (say up to 2%) in a larger amount of shortening of an oleaginous nature such as partially hydrogenated cotton seed oil, and then treating the product as described. This product is used in the cake batter to make the batter emulsion. This product also has the property of imbibing a larger percentage of aqueous material and distributing all other ingredients used in the cake mixture more uniformly. I find even that the proportion of shortening used compared to the flour can be increased somewhat and this has a further effect in increasing the amount of liquid used.

The invention as claimed herein is directed to certain classes only of the various hydrophyllic lipins described in this application, the fatty acid monoglycerides being claimed specifically in my prior application hereinbefore referred to, of which this application is a division.

Having thus described the invention, what is claimed as new and desired to be secured by Letters Patent is:

1. As a new article of manufacture, a shortening material containing substantially no emulsified water and comprising an oleaginous substance having included therein about 1%–2% of a higher aliphatic ester of a glycol, said ester having a molecular formula containing an unesterified glycol hydroxyl group.

2. As a new article of manufacture, a shortening material containing substantially no emulsified water and comprising an oleaginous substance having included therein about 1%–2% of diethylene glycol monostearate.

3. As a new article of manufacture a shortening material containing substantially no emulsified water and comprising a partially hydrogenated oil with a melting point between approximately 95° and 105° F., and having included therein about 1%–2% of a higher fatty acid ester of a glycol, said ester having a molecular formula containing an unesterified glycol hydroxyl group.

4. As a new article of manufacture, a substantially dry shortening material comprising a major proportion of fat of the ordinary triglyceride type and about 1%–2% of a hydrophillic lipin selected from the group consisting of higher fatty acid esters of glycols and higher fatty ethers of polyhydric alcohols, said esters and ethers having a molecular formula containing at least one free glycol or polyhydric alcohol hydroxyl group.

5. As a new article of manufacture, a substantially dry shortening material comprising not less than 98% partially hydrogenated triglyceride oil with a melting point between 95° and 105° F. and not less than 1% of a higher alkyl ether of a polyhydric alcohol, said ether having a molecular formula containing at least one free polyhydric alcohol hydroxyl group.

6. As a new article of manufacture, a shortening material containing substantially no emulsified water and comprising an oleaginous substance having and containing about 1%–2% of a higher mono-alkyl ether of glycerol.

7. As a new article of manufacture, a shortening material containing substantially no emulsified water and comprising an oleaginous substance having included therein about 1%–2% of a hydrophillic lipin consisting essentially of monocetyl ether of glycerol.

8. A flour batter emulsion comprising an oleaginous material, aqueous material, solid material including flour, egg material, and about 1%–2%, based on the amount of oleaginous material, of a higher fatty acid ester of a glycol, said ester having a molecular formula containing an unesterified polyhydric alcohol hydroxyl group, the amount of aqueous material being greater than the amount of flour.

9. A flour batter emulsion comprising an oleaginous material, aqueous material, solid material including flour, egg material and about 1%–2%, based on the amount of oleaginous material, of a higher alkyl ether of a polyhydric alcohol, said ether having a molecular formula containing at least one free polyhydric alcohol hydroxyl group, the amount of aqueous material being greater than the amount of flour.

10. A baked cake comprising oleaginous material consisting essentially of triglyceride fat, solid material including flour, aqueous material in amount substantially exceeding the amount of flour, egg material, sugar, and about 1%–2%, based on the amount of oleaginous material, of a hydrophillic lipin selected from the group consisting of higher fatty acid esters of glycols and alkyl ethers of polyhydric alcohols, said esters and ethers having a molecular formula containing at least one free glycol or polyhydric alcohol hydroxyl group, the amount of hydrophillic lipin being sufficient to effect substantial increase in the volume of the cake.

11. A flour batter emulsion comprising an oleaginous material, aqueous material, solid material including flour, egg material, and less than 2% but not less than 1%, based on the amount of oleaginous material, of a hydrophillic lipin selected from the group consisting of higher fatty acid esters of glycols and alkyl ethers of polyhydric alcohols, said esters and ethers having a molecular formula containing at least one free glycol or polyhydric alcohol hydroxyl group, the amount of aqueous material being greater than the amount of flour.

12. In the process of making cake batters containing flour, shortening, sugar, and unusually large amounts of aqueous material, the step which comprises incorporating in the batter about 1%–2%, based on the amount of shortening, of a higher fatty acid ester of a glycol, said ester having a molecular formula containing an unesterified glycol hydroxyl group.

13. A baked flour product made with shortening and having as a constituent thereof about 1%–2%, based on the amount of shortening, of a higher fatty ether of a polyhydroxy substance, said ether having a molecular formula containing at least one free polyhydroxy OH group.

14. In the process of making cake batters containing flour, shortening, sugar, and unusually large amounts of aqueous material, the step which comprises incorporating in the batter about 1%–2%, based on the shortening, of a higher alkyl ether of a polyhydric alcohol, said ether having a molecular formula containing at least one free polyhydric alcohol hydroxyl group.

BENJAMIN R. HARRIS.